United States Patent
Ferguson et al.

(10) Patent No.: US 7,222,312 B2
(45) Date of Patent: May 22, 2007

(54) SECURE EXCHANGE OF INFORMATION IN ELECTRONIC DESIGN AUTOMATION

(76) Inventors: John G. Ferguson, 21760 SW. 106th Ave., Tualatin, OR (US) 97062; Fedor G. Pikus, 8625 SW. Sorrento Rd., Beaverton, OR (US) 97008; Kyohei Sakajiri, 2129 SW. Harbor Pl., Portland, OR (US) 97201; Laurence W. Grodd, 3705 SE. Main, Portland, OR (US) 97214

( * ) Notice: Subject to any disclaimer, the term of this patent is extended or adjusted under 35 U.S.C. 154(b) by 0 days.

(21) Appl. No.: 10/895,485

(22) Filed: Jul. 20, 2004

(65) Prior Publication Data
US 2005/0071659 A1   Mar. 31, 2005

Related U.S. Application Data

(60) Provisional application No. 60/506,190, filed on Sep. 26, 2003.

(51) Int. Cl.
G06F 17/50 (2006.01)
G04Q 99/00 (2006.01)
H04L 9/00 (2006.01)
H04L 9/3213 (2006.01)

(52) U.S. Cl. .................. 716/3; 716/1; 716/5; 705/51; 705/59; 713/160; 713/165; 713/193

(58) Field of Classification Search ............. 716/1, 716/4, 5, 11; 705/1, 51, 59; 707/1; 709/219; 713/193, 202, 160, 165; 380/44
See application file for complete search history.

(56) References Cited

U.S. PATENT DOCUMENTS

| | | | |
|---|---|---|---|
| 5,708,709 A | * | 1/1998 | Rose .......................... 705/59 |
| 5,787,169 A | * | 7/1998 | Eldridge et al. ............ 713/165 |
| 5,966,707 A | * | 10/1999 | Van Huben et al. .......... 707/10 |
| 5,978,476 A | * | 11/1999 | Redman et al. ............... 705/51 |
| 6,006,190 A | | 12/1999 | Baena-Arnaiz et al. |
| 6,012,033 A | * | 1/2000 | Vanden Berge ................ 705/1 |
| 6,118,869 A | * | 9/2000 | Kelem et al. .................. 380/44 |
| 6,256,768 B1 | | 7/2001 | Igusa |

(Continued)

OTHER PUBLICATIONS

Sotiriou et al., "De-synchronization: asynchronous circuits from synchronous specifications", Sep. 17-20, 2003, SOC Conference, 2003. Proceedings. IEEE International [Systems-on-Chip], p. 165-168.*

(Continued)

*Primary Examiner*—Jack Chiang
*Assistant Examiner*—Helen Rossoshek
(74) *Attorney, Agent, or Firm*—Klarquist Sparkman, LLP

(57) ABSTRACT

Described herein are methods and systems for secure exchange of information related to electronic design automation. Information deemed sensitive and otherwise worthy of protection may be secured by methods such as encryption, obfuscation and other security measures. The secured information may be provided to an electronic design automation tool for processing without revealing at least some of the secured information. For instance, rule files related to integrated circuit manufacturability may be selectively annotated to indicate portions thereof deserving of protection. An encryption tool may be used to secure the information so indicated and generate a file comprising secured information related to electronic design automation. An electronic design automation tool may then unlock and use the secured information without revealing the same. For instance, the tool may be a physical verification tool capable of verifying whether any of the one or more integrated circuit layouts may violate one or more of the secured rules. An error report may be generated without revealing the secured rules.

13 Claims, 12 Drawing Sheets

U.S. PATENT DOCUMENTS

| | | | |
|---|---|---|---|
| 6,401,230 B1 * | 6/2002 | Ahanessians et al. | 716/1 |
| 6,594,799 B1 | 7/2003 | Robertson et al. | |
| 6,782,511 B1 * | 8/2004 | Frank et al. | 716/1 |
| 6,904,527 B1 | 6/2005 | Parlour et al. | |
| 6,976,166 B2 | 12/2005 | Herley et al. | |
| 6,981,153 B1 | 12/2005 | Pang et al. | |
| 6,999,910 B2 | 2/2006 | Koford et al. | |
| 7,111,258 B2 | 9/2006 | Kato et al. | |
| 7,127,692 B2 | 10/2006 | Hamlin | |
| 2002/0010681 A1 * | 1/2002 | Hillegass et al. | 705/59 |
| 2002/0099947 A1 * | 7/2002 | Evans | 713/193 |
| 2002/0107809 A1 * | 8/2002 | Biddle et al. | 705/59 |
| 2002/0156757 A1 * | 10/2002 | Brown | 707/1 |
| 2002/0184494 A1 * | 12/2002 | Awadalla | 713/160 |
| 2003/0140255 A1 | 7/2003 | Ricchetti et al. | |
| 2003/0149669 A1 * | 8/2003 | Howells et al. | 705/51 |
| 2003/0182578 A1 | 9/2003 | Wamock et al. | |
| 2003/0221116 A1 * | 11/2003 | Futoransky et al. | 713/189 |
| 2004/0093397 A1 | 5/2004 | Chiroglazov et al. | |
| 2004/0098391 A1 * | 5/2004 | Robertson et al. | 707/10 |
| 2004/0221179 A1 | 11/2004 | Seshadri | |
| 2004/0230841 A1 | 11/2004 | Savini | |
| 2005/0092848 A1 | 5/2005 | Beit-Grogger et al. | |
| 2006/0041502 A1 | 2/2006 | Blair et al. | |
| 2006/0064383 A1 | 3/2006 | Marking | |
| 2006/0069925 A1 | 3/2006 | Nakai et al. | |

OTHER PUBLICATIONS

Seok-Bum et al., "A novel technology mapping method for AND/XOR expression", May 16-19, 2003, Multiple-Valued Logic, 2003. Proceedings. 33rd International Symposium on, pp. 133-138.*

International Search Report, Sep. 30, 2005, PCT/US2004/029679, 5 pages.

Written Opinion for PCT/US2004/029679, filed Sep. 10, 2004, 7 pages, date written Sep. 30, 2005.

Ko et al., "A Novel Technology Mapping Method for AND/XOR Expressions," *Proceedings of the 33rd International Symposium on Multiple-Valued Logic*, 2003.

"IEEE Standard for Verilog® Hardware Description Language," *IEEE Std. 1364-2005*, pp. 467-541, Apr. 7, 2006.

"IEEE Standard for Verilog® Hardware Description Language," *IEEE Std. 1364-1995*, 879 pages, Sep. 28, 2001.

Goering, "Open crypto tool standard danglesKEY TO IP," 5 pages <http://www.eetimes.com/showArticle.jhtml?articleID=189401977>, Jun. 19, 2006.

Dauman, "An open IP encryption flow permits industry-wide interoperability," *Synplicity, Inc. White Paper*, 8 pages, Jun. 2006.

Mehta, "Essential elements of a successful IP evaluation," *EETimes*, 4 pages <http://www.eetimes.com/editorial/2000/insideip00009.html>, Sep. 20, 2006.

"HSPICE, The gold standard for accurate circuit simulation," *Synopsys Data Sheet*, 4 pages, 2006.

"ESNUG," *Deepchip*, 13 pages <http://www.deepchip.com/posts/0329.html#09>, Sep. 18, 2006.

* cited by examiner

SECURE EXCHANGE OF INFORMATION IN ELECTRONIC DESIGN AUTOMATION

CROSS REFERENCE TO RELATED APPLICATION

This application claims the benefit of U.S. Provisional application 60/506,190, filed Sep. 26, 2003, which is incorporated by reference herein.

TECHNICAL FIELD

The technical field relates to electronic design automation. More particularly, the field relates to methods of secure exchange of information related to electronic design automation.

BACKGROUND

Modern electronic systems including circuits are becoming increasingly complex. Thus, it is not surprising that it may require increasingly specialized skills and capabilities to design and manufacture these complex systems. As these skills and capabilities become more specialized, it may take the cooperative effort of engineers from a number of different entities to complete the engineering required to successfully design and manufacture such electronic systems. It is also possible that, in some cases, one entity will rely upon the specialized skills and capabilities of an outside organization (e.g., vendor) to meet a specific need.

For example, these days it is common for electronic system designers to outsource the manufacturing or assembly of their electronic systems to other businesses that specialize in manufacturing. In these scenarios, entities may need a reliable and secure way for exchanging information related to electronic design automation (EDA) with their partner entities, but still maintain control over how much of their trade secrets, capabilities, skills and the like may be divulged to such partner entities.

In one particular example, a system on chip (SOC) designed by one entity may need to be manufactured by a custom integrated circuit (IC) manufacturer. Foundries associated with these manufacturers usually have constraints (e.g., manufacturing) which may have a bearing over whether a particular IC layout selected by a design engineer can in fact be manufactured by the foundry. These constraints are typically expressed as rules in formats selected for such communication (e.g., Standard Verification Rules Format (SVRF)). A file comprising such rules can be referred to as a rule file. Constraints expressed in a rule file may contain information related to a particular foundry's capabilities, trade secrets and other sensitive information which the foundry may not want revealed to certain parties. However, for example, such information may be useful for designing IC layouts that conform to the rules such that these layouts can be manufactured by the selected foundry.

Thus, there is a need for systems and methods that allow for secure exchange of EDA related information between entities for use in EDA tools such that each entity can control access to information that it considers proprietary (e.g., trade secrets and other confidential information).

SUMMARY

Described herein are methods and systems for the secure exchange of information related to electronic design automation. In one aspect, information related to electronic design automation may be secured by encryption, password protection, obfuscation and other security measures. In another aspect, information related to electronic design automation may be annotated to indicate portions thereof comprising secured information related to electronic design automation.

In yet another aspect, an electronic design automation tool may receive information related to electronic design automation annotated to indicate secured portions thereof. Upon receiving such information electronic design automation tool may identify those portions of the information comprising secured information related to electronic design automation and unlock the secured information for processing. In one aspect, the electronic design automation tool may process the secured electronic design automation information without revealing at least some of the secured information to unauthorized persons, tools, systems, or otherwise compromise the protection of the secured information.

In another aspect, information related to electronic design automation may be secured by encryption methods using one or more keys. Information related to keys used for securing information may be exchanged between parties privately or publicly. In one aspect, an individual or party that secured or is providing the secured information related to electronic design automation may share key related information along with the secured information. The electronic design automation tool may then use the key related information to unlock the secured information for processing. In another aspect, a password along with a key may be used for securing information related to electronic design automation. The key, password or other security mechanisms may also be user specified. Such security measures may also be selected by the encryption tool, the electronic design automation tool or some other tool.

In one aspect, an electronic design automation tool may process electronic design automation related information in a secure manner and may also secure at least of the results of such processing. Such secured results may be provided to other electronic design automation tools for further processing without revealing at least some of the secured results. Also one tool may unlock at least some of the secured electronic design automation related information, process the information and the pass at least some of the information onto another electronic design automation tool for further processing. In another embodiment, the first electronic design automation tool may secure at least some of the electronic design automation related information again prior to transferring it onto to another electronic design automation tool for further processing.

In yet another aspect, the secured information related to electronic design automation comprises rules related to manufacturability of integrated circuits. In one aspect, selected portions of such rules may be secured and provided to an electronic design automation tool, such as a physical verification tool, which can use the rules to verify whether they may be violated by one or more integrated circuit layouts related to a system design. The physical verification tools may then provide information related to the evaluation to users of the tool or to other tools without disclosing at least some of the rules that have been selected for protection.

Additional features and advantages will become apparent from the following detailed description of illustrated embodiments, which proceeds with reference to accompanying drawings.

DETAILED DESCRIPTION

The disclosed invention includes all novel and unobvious features and aspects of the embodiments of the system and methods described herein both alone in various combinations and sub-combinations thereof. The disclosed features and aspects of the embodiments can be used alone or in various novel and unobvious combinations and sub-combinations with one another.

Although the operations of the disclosed methods are described in a particular, sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "determine" to describe the disclosed methods. Such terms are high-level abstractions of the actual operations that are performed. The actual operations that correspond to these terms will vary depending on the particular implementation and are readily discernible by one of ordinary skill in the art.

Some of the methods described herein can be implemented in software stored on a computer-readable medium and executed on a computer. Some of the disclosed methods, for example, can be implemented as part of an electronic design automation (EDA) tool. Such methods can be executed on a single computer or a networked computer. For clarity, only those aspects of the software germane to these disclosed methods are described; product details well known in the art are omitted. For the same reason, the computer hardware is not described in detail.

Figure 1:
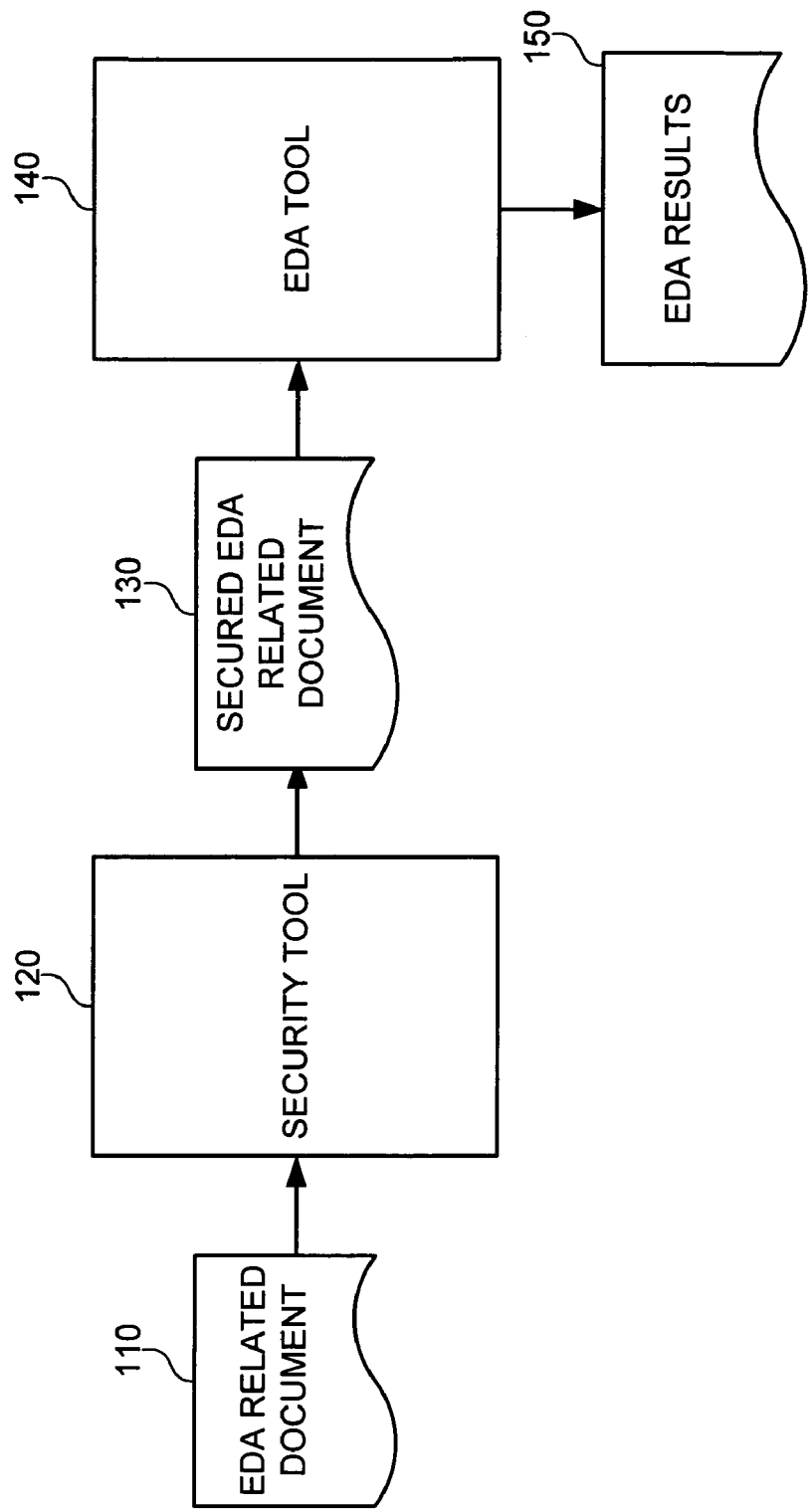
FIG. 1 is a block diagram illustrating one embodiment of a system for secure exchange of information related to electronic design automation.

Exemplary Overall Systems for Exchanging EDA Related Information in a Secure Manner FIG. 1 illustrates an exemplary system for exchanging EDA related information in a secure manner. Documents 110 comprising EDA related information may be secured by a security tool 120 (e.g., encryption tool) to create a document 130 comprising a secured version of the EDA related information prior to being processed by an EDA tool 140. The EDA tool 140 may then unlock the secured information from the EDA related document 130 to use it for processing, which may generate results 150 of interest for a user of the EDA tool 140. In one embodiment, the EDA tool 140 may itself encrypt or otherwise secure the EDA related information 110. In other words, the locus of the securing operation can be anywhere that is suitable for a particular system implementation. Also, information secured by one EDA tool 140 may be passed onto other EDA tools for further processing without revealing contents of the secured information.

In one embodiment, the EDA results 150 may also be provided to a user in a format that does not reveal EDA related information designated to be proprietary or otherwise deserving of protection. For instance, results 150 that may otherwise reveal secured information may just be listed as "Encrypted" or as some other indicator of its protected status. Thus, the EDA tool 140 may secure selected portions of the results 150 to avoid revealing secured information. Also, results that may otherwise reveal secured information may be shared in a limited manner such as listing rule errors in a particular IC layout without revealing the particulars about the rules that were violated by the IC layout.

In this manner, an EDA related document (e.g., 110) comprising intellectual property (IP) may be created by an engineer of one entity and can be shared with engineers of other entities for their use in an EDA tool 140 without having to reveal any sensitive information within the EDA document 110.

Exemplary Overall Methods of Securing an EDA Related Document

Figure 2:
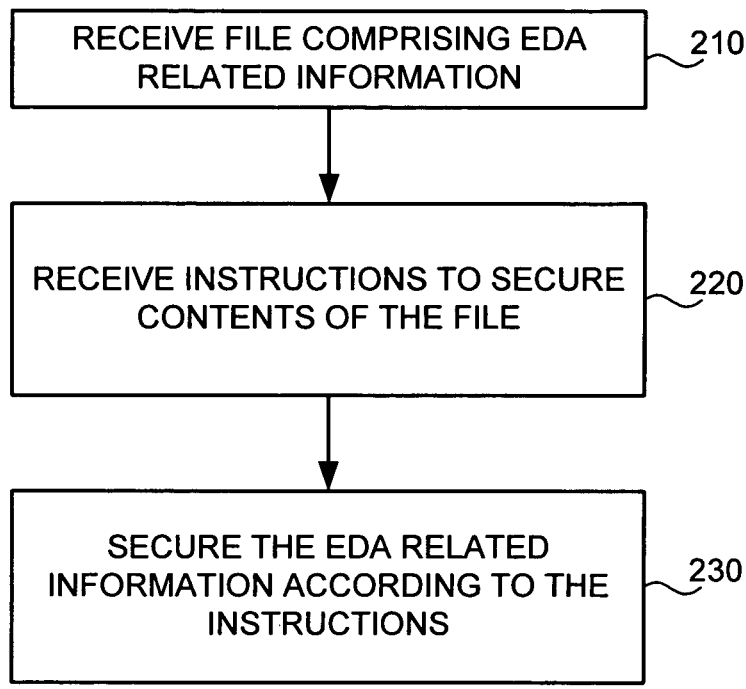
FIG. 2 is a flow diagram describing one embodiment of a method for securing information related to electronic design automation.

FIG. 2 illustrates an exemplary process for securing information in an EDA related document. At 210, a security tool (e.g., 120 of FIG. 1) may receive EDA related information included in an EDA related document (e.g., 110 of FIG. 1) to be secured. Further at 220, the security tool (e.g., 120) may also receive further instructions regarding a scope and nature of the protection (e.g., by encryption) to be applied to the EDA related information in the EDA document (e.g., 110). For instance, the entire EDA related document (e.g., 110) need not be designated as deserving or otherwise needing protection. Thus, a selected portion of the EDA related document (e.g., 110) may be secured. Thus, a security tool (e.g., 120) may receive instructions at 220 that indicate one or more portions of an EDA related document (e.g., 110) to be secured. These instructions may also include other data related to securing the EDA related document (e.g., 110). For instance, such information may include data related to a key for encryption, a password or other data for securing EDA related information. At 230, the EDA related information is secured according to the instructions.

In one embodiment, these instructions may be part of the EDA related document (e.g., 110) itself. For instance, an EDA related document (e.g., 110) itself may be annotated with instructions that indicate portions of the document that are to be secured. Thus, at 230, the security tool (e.g., 120) may secure only portions of the EDA related document (e.g., 110) designated for protection according to the instructions. Alternatively, the instructions related to securing the EDA related information may also be separate from the EDA related document itself (e.g., 110) and thus, may be received by the security tool 120 separately. Also, the instruction may not be received from outside the security tool 120. Instead, the instructions may originate from the security tool 120.

Exemplary Methods of Processing Secured EDA Related Information by an EDA Tool

Figure 3:
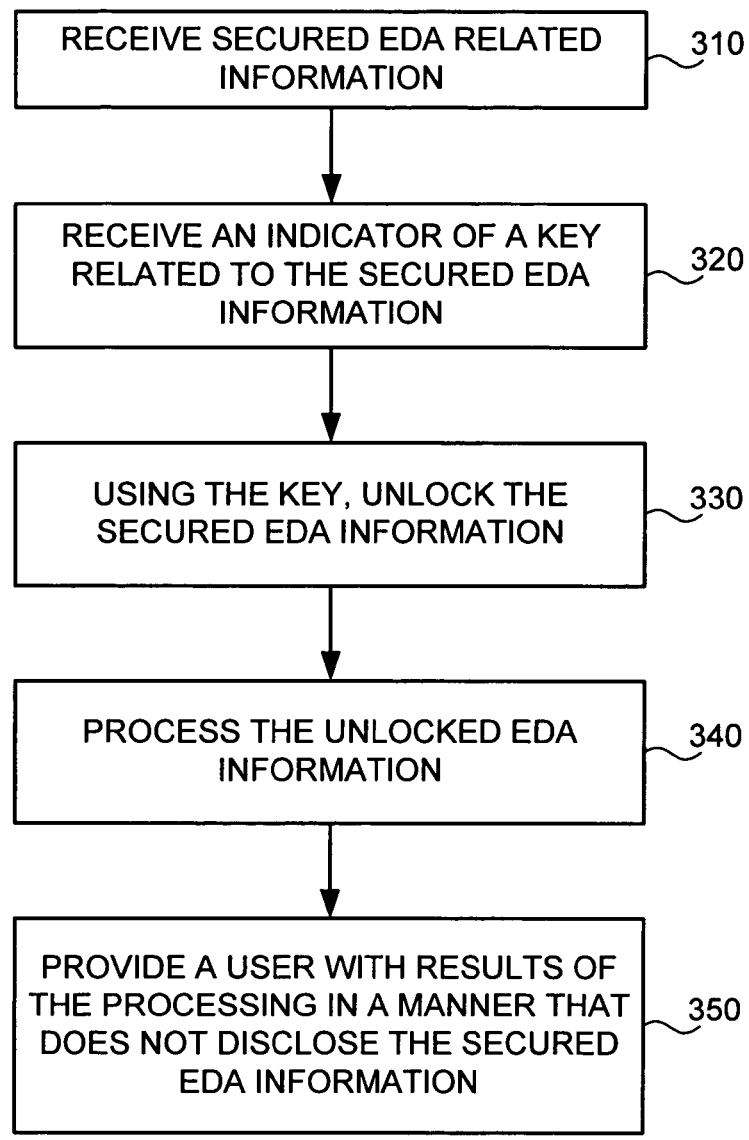
FIG. 3 is a flow diagram describing one embodiment of a method of securely processing information related to electronic design automation.

FIG. 3 illustrates an exemplary method for processing secured EDA related information by an EDA tool. At 310, the EDA tool (e.g., 140 of FIG. 1) receives encrypted or otherwise secured EDA related information within an EDA related document (e.g., 130 of FIG. 1). Depending on the method chosen for securing the information, at 320, the EDA tool (e.g., 140 of FIG. 1) may also receive data related to a key, a password, or other information associated with the securing the EDA related information in the document (e.g., 130 of FIG. 1). For instance, in case of information secured via encryption, data related to a key, a password or other data related to securing EDA related information may be received. At 330, such data associated with securing the information may be used to gain access to the secured portion of the EDA related document (e.g., 130). At 340, the EDA tool (e.g., 140) may process the now unlocked EDA related information and at 350, provide a user with results of the processing in a manner so as to not reveal any sensitive portions of the EDA related information (e.g., any portion of the secured information that is to be concealed from the user of the EDA tool).

The decrypted or otherwise unlocked EDA related information may be passed on to other EDA tools for further processing and generating other results without revealing sensitive EDA related information. The information that is secured when from one tool to another may be the same information that was initially secured or may be a subset or super set of such information. Additionally, one EDA tool (e.g., 140 of FIG. 1) may secure the results (e.g., 150) from processing the secured EDA related information (e.g., 130) and provide such secured results (e.g., 150) to other EDA tools for further processing without revealing the secured EDA information (e.g., 130). For instance, an EDA tool used for layout versus schematic (LVS) verification may processes EDA related information such as layout and schematic data and provide results comprising netlists. Such results may be encrypted or otherwise secured and then provided to other EDA tools such as parasitic extraction tools (PET) for further processing without revealing the secured information.

Figure 4:
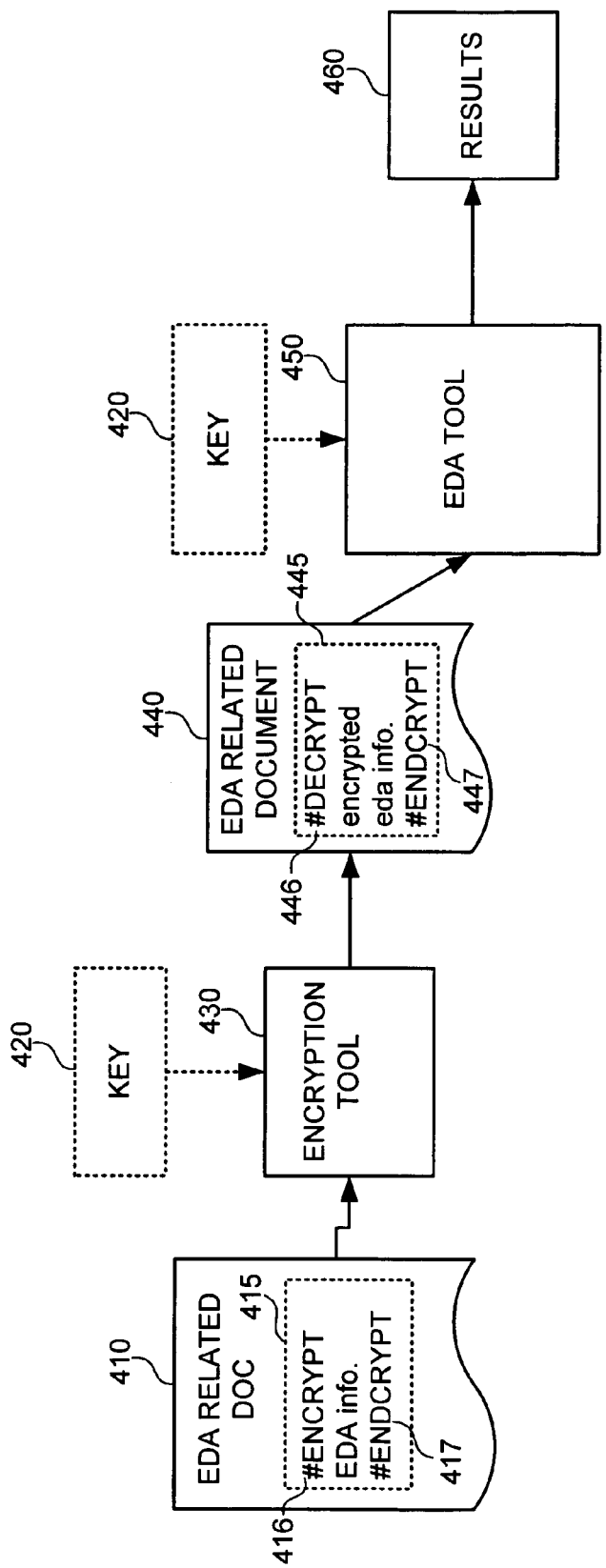
FIG. 4 is a block diagram illustrating one embodiment of a system for secure exchange of information related to electronic design automation using a key for securing unsecured information related to electronic design automation.

Exemplary Methods of Indicating EDA Related Information in an EDA Related Document to be Secured FIG. 4 illustrates an exemplary method for indicating portions of an EDA related document that should be subject to protection. For instance, in an EDA related document (file) 410, the EDA related information 415 to be secured may be indicated as information that is enclosed within a starting tag (e.g., "#ENCRYPT" at 416) and a closing tag (e.g., "#ENDCRYPT" at 417). Furthermore, in an EDA related document comprising encrypted or otherwise secured EDA information at 440, the secured portion of the document 445 may also be indicated by a starting tag (e.g., "#DECRYPT" 446) and a closing tag (e.g., "#ENDCRYPT" 447). This can indicate to an EDA tool 450 where to begin and end decryption or other methods of unlocking secured information. Such language is exemplary. Other words or character sets can also be used to signify the beginning and end of a section of code to be encrypted, decrypted or otherwise secured and unlocked. Also, more than one portion of an EDA related document 410 may be designated for protection and may be placed between different or the same start and end designators. Other tags or indicators may also be suitably used.

In one embodiment no such explicit indicators are used. For instance, portions of the EDA related document or electronic file to be secured may be determined based on whether the portions relate to a header, a body or some other selected portion of the file. For instance, the body may be secured whereas the header may not be secured. Furthermore, a user, or a tool may indicate that data related to selected subjects such as netlists, design rule checking (DRC), optical, process correction (OPC) and other suitable EDA information should be secured. For decrypting or otherwise unlocking secured information, a system may presume, for example, that all illegible data in a secured file should be decrypted or otherwise unlocked.

Exemplary Methods for Securing

Several methods may be used for securing information within EDA related documents. For instance, encryption is one such method. For encryption, a block cipher method such as, advanced encryption standard (AES) can be used by an encryption tool. Alternative encryption methods can include the Rivest, Shamir, and Adelman (RSA) encryption, Data Encryption Standard (DES), simple dictionary key permutation, or other suitable encryption methods. However, the securing of the portion of the EDA related document is not limited to encryption. For example, the portion to be secured can be further or alternatively secured through other suitable securing including obfuscation and/or one-way hashing.

Exemplary Uses of Keys in the Process of Securing EDA Related Information

FIG. 4 illustrates systems and methods of encrypting EDA related information with the use of keys. As shown in FIG. 4, an encryption tool 430 may use a key 420 to encrypt EDA related information included in the EDA related document 410. The key may be, for example, specified by a source external to the encryption tool 430. The key 420 may also be selected randomly by the encryption tool 430. The key 420 can then be provided to a user of the EDA tool 450 to be used for decrypting the EDA related information. The EDA tool 450 may also generate the results 460 without revealing any of the decrypted EDA related information used by the EDA tool 450.

In one embodiment, the exchange of the key 420 may be a public key exchange. For instance, a third party may be used to broker the exchange of key related information. The exchange of the key 420 may also be a private exchange.

Figure 5:
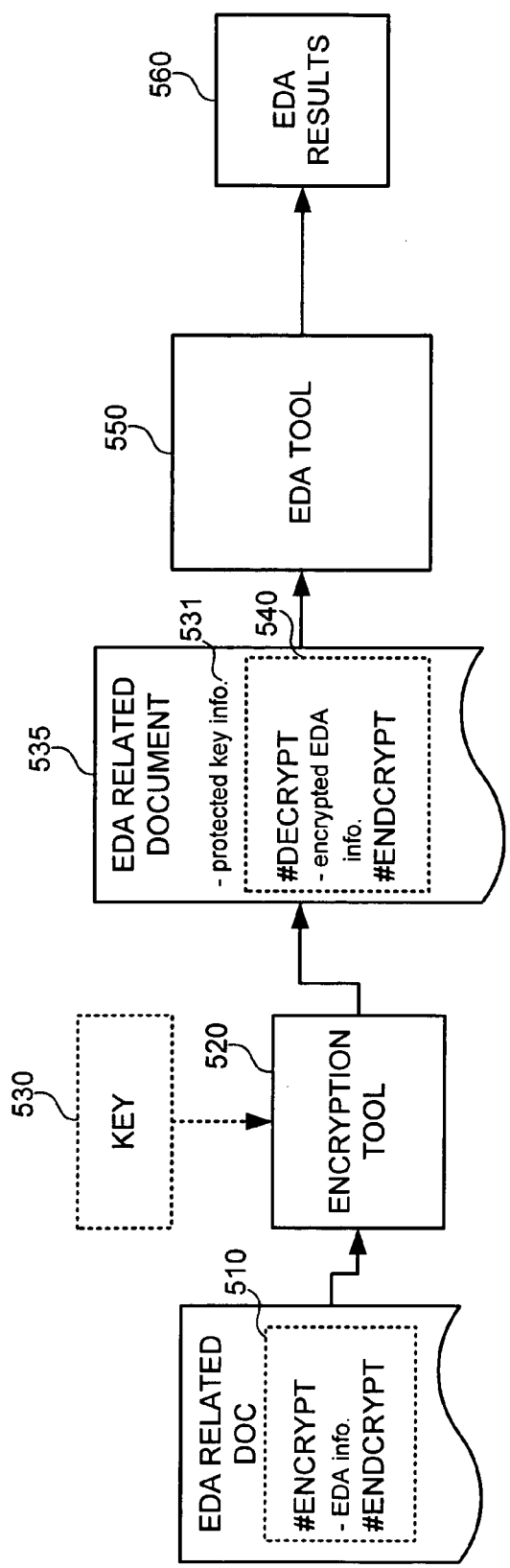
FIG. 5 is a block diagram illustrating one embodiment of a system for secure exchange of information related to electronic design automation using key related information embedded in a file comprising the secured electronic design automation information.

FIG. 5 illustrates yet another exemplary method of encrypting EDA related information using keys. For instance, an encryption tool 520 may encrypt EDA related information 510 using a key 530. Furthermore, information 531 related to the key 530 used for encryption may be included within an EDA related document 535 comprising the encrypted EDA related information 540. Thus, instead of obtaining the key 530 publicly, the key exchange between entities may be private. The key related information 531 may itself be obfuscated, encrypted, password protected or otherwise afforded suitable protection. To decrypt the secured EDA information the EDA tool 550 may first need to obtain access to the protected key related information 531. The EDA tool 550 may then use the unsecured version of the key related information 531 to obtain a key 530 to decrypt the encrypted EDA related information 540 for processing. Also, the key related information 531 may comprise the key itself.

The key 530 may be specified by a user of the encryption tool 520. Alternatively, a key may be randomly selected by the encryption tool 520. The encryption tool 520 may select the key 530 from an array of master keys to which it has access. Alternatively, the EDA tool 550 may match the key related information 531 to one or more keys in an array of master keys for unlocking a secured EDA document 535.

Figure 6:
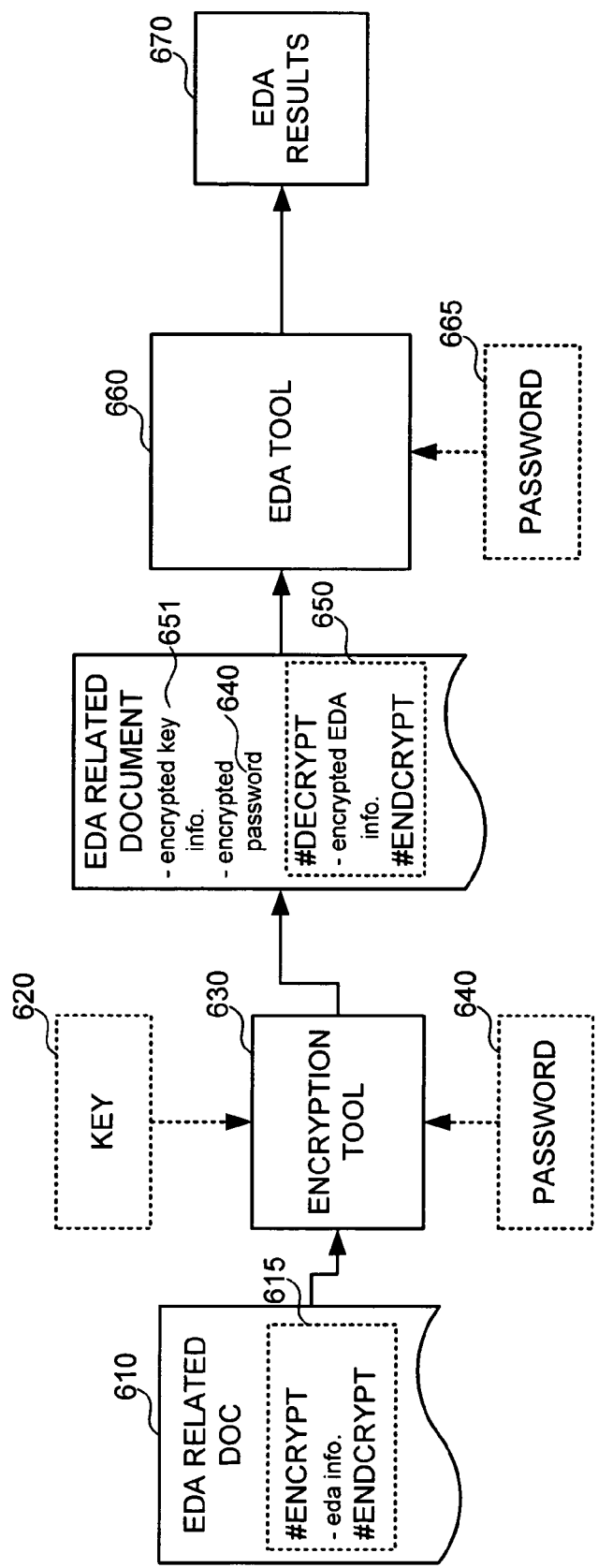
FIG. 6 is a block diagram illustrating one embodiment of a system for secure exchange of information related to electronic design automation using a key and a password for securing unsecured information related to electronic design automation.

Exemplary Uses of Keys Along with Passwords for Securing EDA Related Information Alternatively, as shown in FIG. 6, in addition to a key 620, a password 640 may be used in the encryption of EDA related information 615. In one embodiment, the password may be embedded along with the encrypted EDA related information 650 received by the EDA tool 660. It may then be decrypted by the EDA tool 660 and matched to a user entered password 665 before providing the results 670 to a user. Additionally, the EDA tool 660 may not even process the decrypted EDA related information unless there is a match between the password 665 obtained from a user and one at 640 obtained along with the encrypted EDA related information 650.

Alternatively, a password 640 may be used to encrypt, obfuscate, protect, or otherwise alter the key related information 651 embedded along with the encrypted EDA related information 650. Then, the EDA tool 660 may require that a user of the EDA tool 660 provide it with the password 665 before attempting to decrypt the key related information 651 embedded along with the EDA information. Also, a key itself may be encrypted, obfuscated, or otherwise protected by a password 640.

Alternatively, the user's password is either (1) embedded into the encrypted portion through obfuscation or (2) used to alter the master key. With original encryption password, encrypted rules can be later decrypted. Case (1): the system can decrypt the rules using the master key, and obtain the password embedded in the encrypted rules. If the given password at the run time matches the embedded password, then the system goes ahead and continues the operation as in the common embedded key case. Case (2): the system regenerates the altered key using the given password at the runtime. The given password is incorrect, the system cannot decrypt the rules at all.

Figure 7:
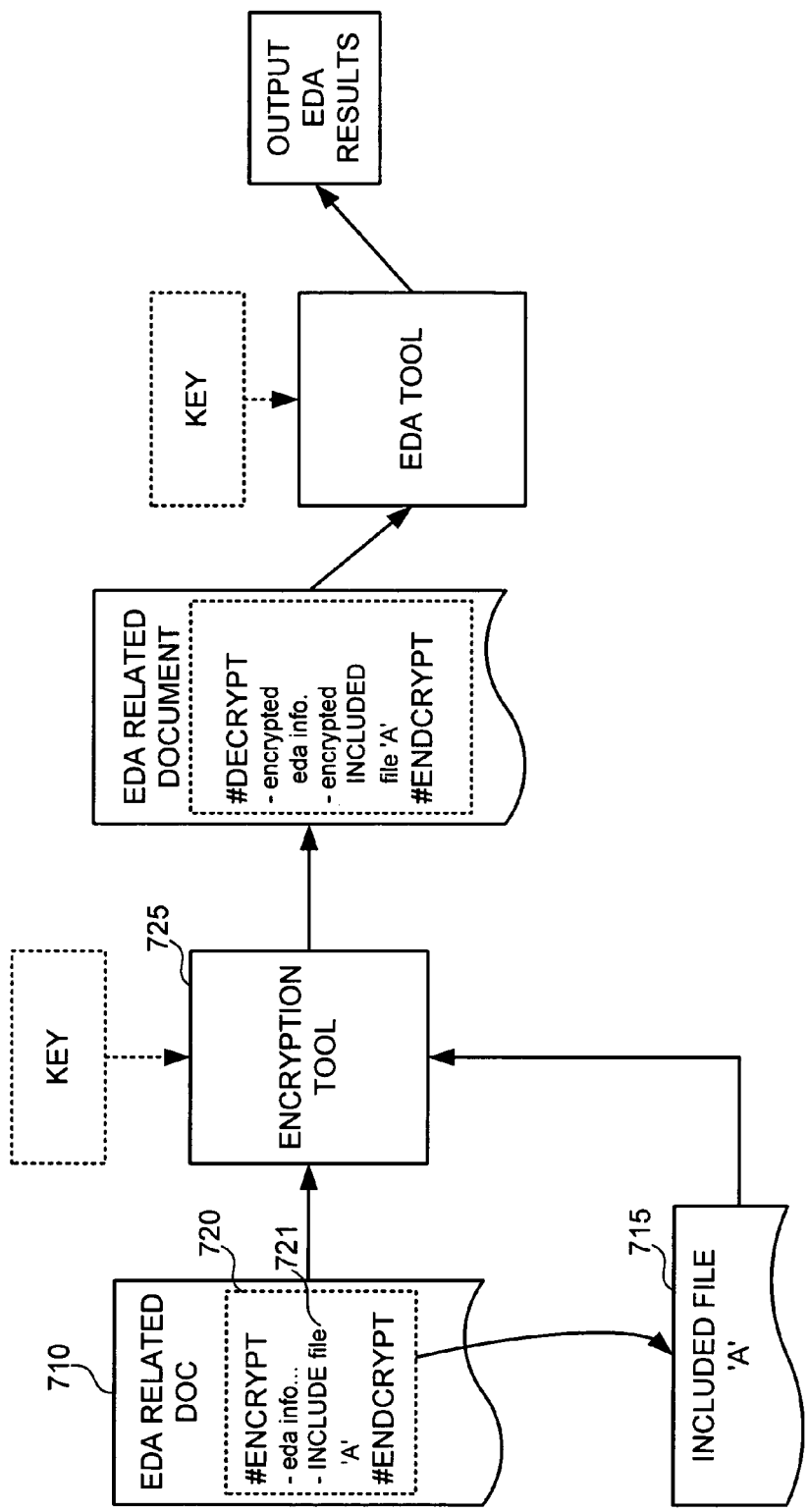
FIG. 7 is a block diagram illustrating one embodiment of a system for secure exchange of information related to electronic design automation wherein some of the information selected for securing is incorporated by reference to another file.

An Exemplary Method of Encrypting EDA Related Information in Files Referred to Within an EDA Related Document In some instances, EDA related documents may refer to or otherwise rely on information included in another file. For instance, as shown in FIG. 7, a file 'A' 710 and hence, any information stored within file 'A' 715 may be referred to within an EDA related document 710. If, for instance, such a file is referred to within EDA related information selected for encryption 720 then the encryption tool 725 may be triggered by an instruction such as a "#INCLUDE" instruction 721 to access the file 715 and encrypt it along with the other EDA related information designated for encryption at 720. The "#INCLUDE" instruction is an exemplary syntax. Other syntax may also be used to achieve the same result. Other files and any information included therein may be encrypted in a similar manner. In this manner, multiple files from multiple sources may be secured and processed.

Figure 8:
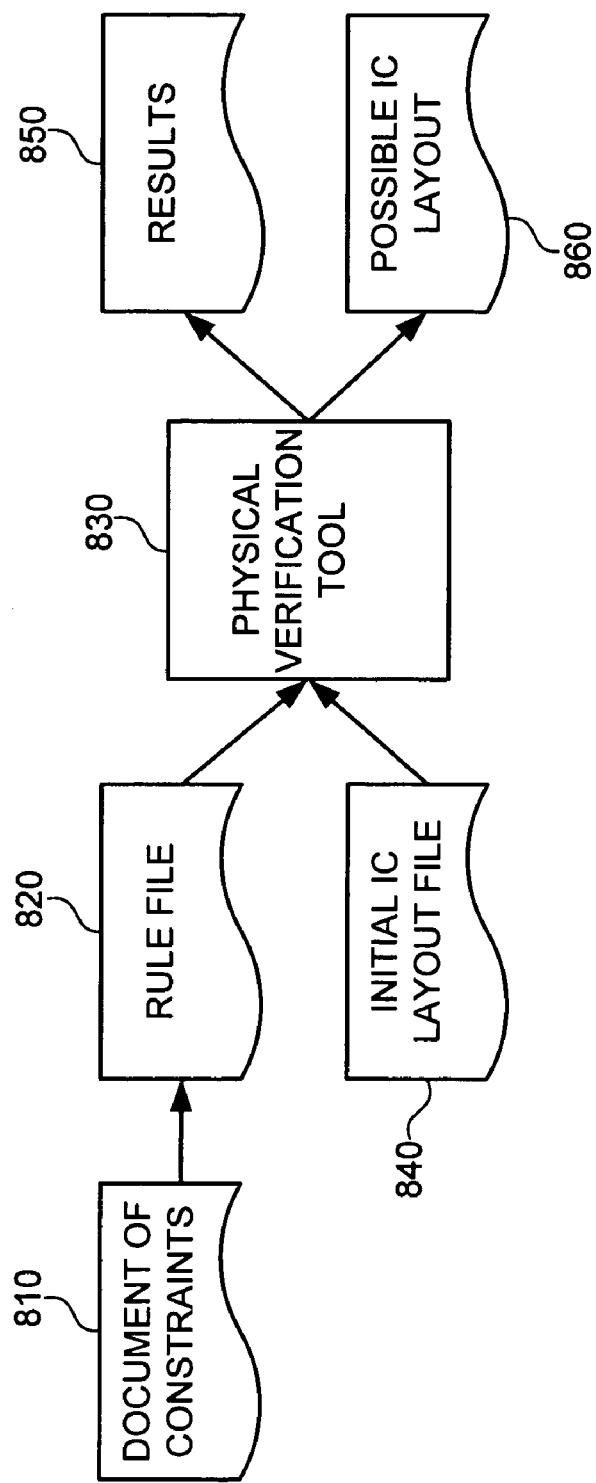
FIG. 8 is a block diagram illustrating one embodiment of a system for secure exchange of information related to rules governing manufacturability of integrated circuits.

Exemplary Embodiments of Systems and Methods for Encrypting EDA Information Related to IC Manufacturing One particular application of methods described above for secure exchange of EDA related information between entities may involve the exchange of such information for determining the manufacturability of certain IC layouts based on constraints of a particular manufacturer (e.g., a foundry). FIG. 8 is a block diagram illustrating an embodiment of one such method of determining the manufacturability of a given integrated circuit (IC) layout. An IC manufacturer (e.g., a foundry) may have certain manufacturing constraints that apply to different IC layouts. An engineer, such as a process engineer, might create a document of constraints 810 that contains information regarding constraints specific to that manufacturer. The document of constraints 810 can be incorporated into a rule deck or rule file 820 (e.g., an ASCII file) that further describes the particular constraints. The rule file may also comprise information such as a picture, a set of design data base objects and schematic representations of the rules The rule file 820 may then be used with an EDA tool such as a physical verification tool 830 (e.g., Calibre™, a Mentor Graphics Corp. tool) to determine if an initial IC layout 840 (e.g., as described in file types such as GDSII, OpenAccess, and Milkyway) violates the manufacturer's constraints. The physical verification tool 830 may thus be used to determine whether or not the initial IC layout 840 is manufacturable.

In the illustrated embodiment, the physical verification tool 830 may read the initial IC layout 840 and, using the rule file 820, determine if the initial IC layout 840 violates any of the constraints in the rule file 820. The physical verification tool 830 may provide a results file 850 containing a record of any errors encountered in the layout, as well as information regarding the operation of the tool itself (e.g., the amount of time or memory needed for the tool to run its verification). The physical verification tool 830 may also provide a manufacturable IC layout 860 (e.g., a layout in which no constraints are violated) that the design engineer can choose to use or evaluate for manufacture of the IC. If the initial IC layout 840 does not violate any of the constraints, the manufacturable IC layout 860 may just comprise the initial IC layout 840. If the initial IC layout 840 violates at least one constraint, however, the manufacturable IC layout 860 may comprise proposed changes that would make the layout manufacturable.

However, a manufacturer may desire not to reveal a given rule file (e.g., the rule file 820) containing proprietary information considered to be intellectual property (e.g., one or more trade secrets). This may be so because sometimes, for example, the person who writes the rule file 820 is not the same person who runs the physical verification tool 830 that uses the rule file 820 (e.g., the design engineer). Nonetheless, it is often desirable for the manufacturer to provide the engineer with something detailing at least some of the constraints specific to that manufacturer so that a design engineer may determine whether a given IC layout is manufacturable by that manufacturer even if the entire rule file is not revealed.

Figure 9:
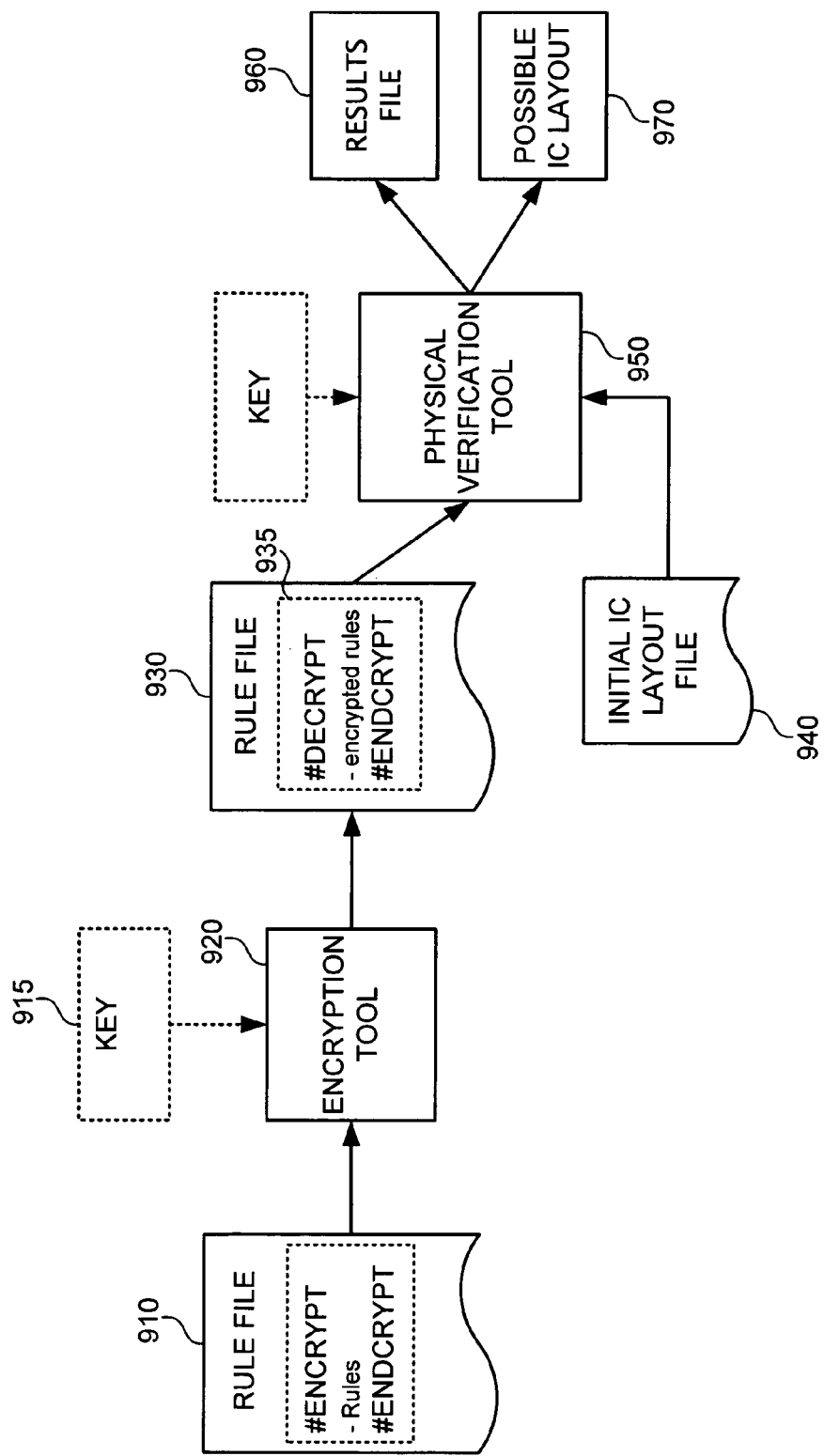
FIG. 9 is a block diagram illustrating one embodiment of a system using keys to securely exchange information related to rules governing manufacturability of integrated circuits.

FIG. 9 is a block diagram illustrating an exemplary embodiment of a system for securely exchanging rule files. A rule file 910 may contain information relating to constraints specific to a certain manufacturer. In one particular embodiment, the rule file 910 is written in a known format such as the standard verification rules format (SVRF). The rule file 910 can contain proprietary information that the manufacturer does not want to be discovered by whoever receives the rule file 910. The rule file 910 may also contain other information that may or may not be proprietary and with which the manufacturer is less concerned. Rules to be protected (e.g., rules the manufacturer does not want to be shown in the transcript) can include, for example, layer creation commands, design-rule-checking (DRC) checks, layout-vs.-schematic (LVS) device statements, in-file LITHO operations, optical-and-process-correction operations (e.g., TDOPC and OPCSbar operations), parasitic-extraction (PEX) statements, or FRACTURE commands. This is not an exhaustive list, as the manufacturer, in accordance with this disclosure, can select (or allow software selection of) any information for this higher protection.

As described above, the portion of the rule file 910 comprising such highly proprietary information, or any one or more sections of the file sought to be secured, can be placed between a first set of designated key words in the rule file 910. For example, in one particular embodiment, such key words can be "#ENCRYPT," signifying the beginning of a section to be secured, and "#ENDCRYPT," signifying the end of the section to be secured. The modified rule file 910 can then be processed by an encryption tool 920. The encryption tool 920 can secure the portion of the file between "#ENCRYPT" and "#ENDCRYPT" through an encryption process, resulting in an encrypted rule file 930. In one embodiment, the encrypted rule file 930 contains the encrypted portion between a second set of designated keywords, such as "#DECRYPT" and "#ENDCRYPT," respectively. Other non-encrypted information is desirably also included in the rule file 910, in which case the encrypted rule file 930 is only partially encrypted.

In this embodiment, an optional key 915 is used in the encryption process. The optional key 915 can be a private key, for example. In one particular embodiment, a user selects a key 915 to be used in the encryption process. In an alternative embodiment, a key 915 is randomly selected by the encryption tool 920. The encryption tool 920 can contain or have access to an array of master keys from which it might select a key 915 to use. Alternatively, a user can choose a password to be used in place of or in connection with a key 915. Such a password can be embedded into the encrypted portion of the file at 935 and protected through obfuscation, for example. Alternatively, the password can be used to alter the master key.

The encrypted or partially encrypted rule file 935 can be provided as input, along with the initial IC layout 940, to the physical verification tool 950 for processing. In one embodiment, the physical verification tool 950 decrypts and processes the section or sections 935 of the encrypted rule file 930 between the second set of designated keywords (e.g., "#DECRYPT" and "#ENDCRYPT") without fully revealing the decrypted section to the user of the physical verification tool 950. The decryption can be done in the run-time memory space of the physical verification tool 950, for example.

Exemplary Methods for Protecting EDA Information Included in the Results of Processing by EDA Tools Referring to FIG. 1, the EDA related information contained within EDA related document 110 and protected by encryption prior to its use by an EDA related tool 140 may lose its protection if it is disclosed to a user of the EDA tool 140 via the results 150. Thus, in one embodiment, portions of a result 150 file comprising EDA related information designated as sensitive may be obscured, encrypted, or otherwise altered to prevent the user from learning about any sensitive EDA related information. For instance, with respect to the implementation related to IC layouts 940 described in FIG. 9, the physical verification tool 950 may not produce a full transcription for the secured rules 930. Instead, the physical verification tool 950 may produce only partial transcription of the secured rule file 930 as results 960 so that the secured portion of the rule file 935 is not disclosed.

The physical verification tool 950 can provide other EDA related information as results 960 and, if possible, may optionally provide a manufacturable IC layout 970. Such information can further or alternatively be recorded in a database. Error information related to violations of the constraints in the rule file 910 can be communicated in various ways. In one particular embodiment, error information regarding the secured portion of the rule file 935 is handled differently than error information regarding the rest of the file. For example, error information regarding the secured portion of the file 935 can be limited, whereas error information regarding the rest of the file can be much more detailed. In one embodiment, the error information regarding the secured portion of the rule file 935 simply states how many errors exist in the initial IC layout 940.

For example, an otherwise listed rule might simply be shown as "Encrypted" in the results file 960. In another embodiment, the error information regarding the secured portion describes at least one type of error in general terms, such as indicating that two components are too close together, for example. In an alternative embodiment, the error information regarding the secured portion describes at least one type of error in specific terms, such as detailing which two components are too close together and at what location, for example.

Figure 12:
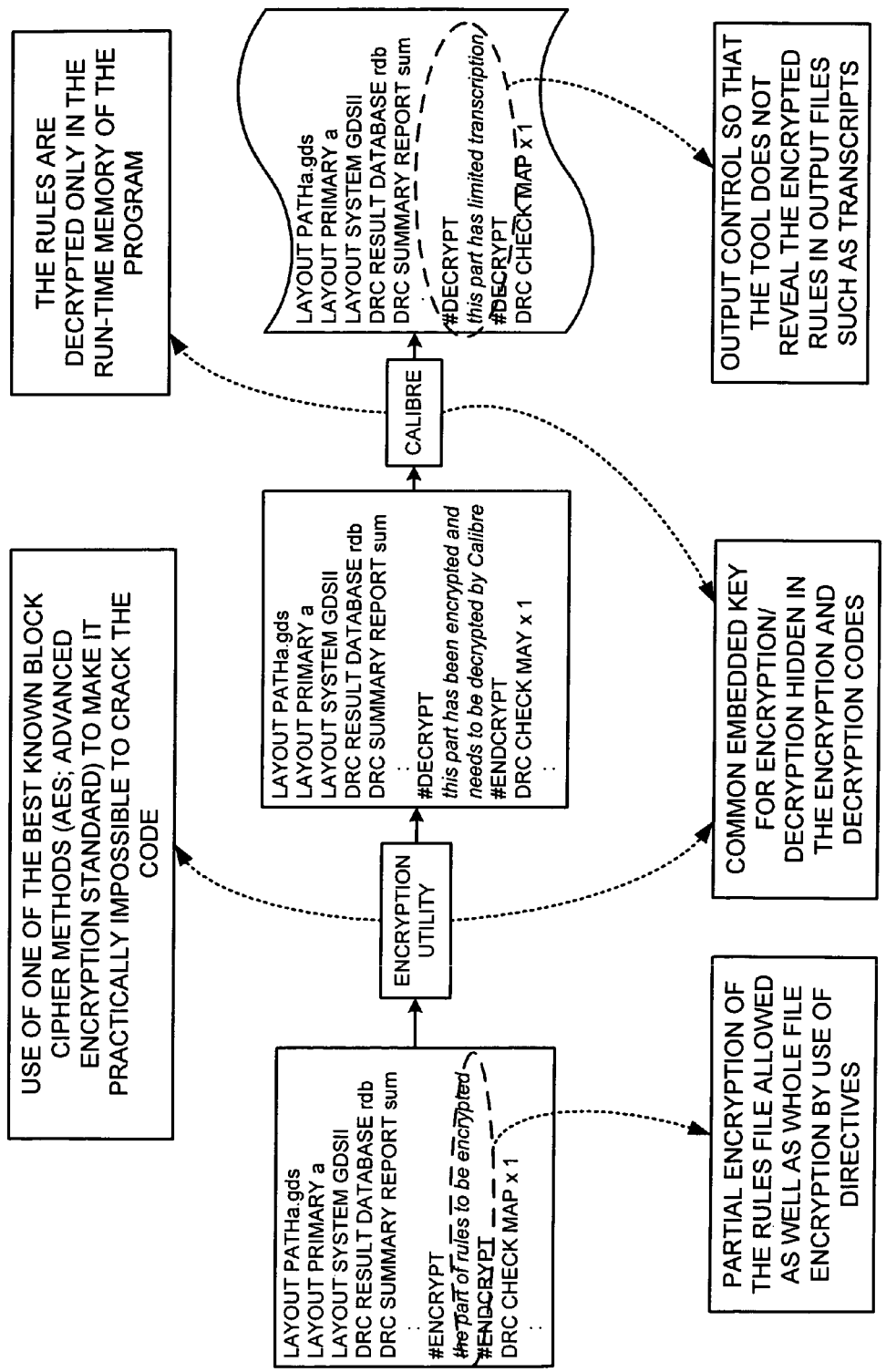
FIG. 12 illustrates one embodiment that allows partial encryption of the rule files as well as the whole file by use of directives.

FIG. 12 illustrates one embodiment that allows partial encryption of the rule files as well as the whole file by use of directives. A common embedded key for encryption/decryption is hidden in the encryption and decryption codes.

Furthermore, the rules are decrypted only in the runtime memory of the program. Output control so that the tool does not reveal the encrypted rules in output files such as transcripts is also provided.

Exemplary EDA Tools and EDA Related Information

Some of the examples above (e.g., FIG. 9), discuss methods and systems of secure exchange of EDA related information by illustrating the exchange of IC rule files for use in a physical verification tool. However, physical verification using rule files is only one type of EDA application in which the disclosed methods may be used. Other EDA applications include (but are not limited to) such uses as layout versus schematic verification (LVS), generating parasitic extraction flows (e.g., layout parasitic extraction (LPE)) and applying tools for resolution enhancement technology (RET). Other tools such as synthesis tools, emulation tools and simulation tools may also use EDA related information in a secure manner using the methods and systems described herein.

EDA related information to be secured and processed in a secure manner may include any information related to design for manufacture (DFM) processes, methods, systems and tools. Also, besides rule files, other EDA related information that can be protected using the disclosed principles include (but are not limited to) Oasis, Spice net lists, VHDL, and Verilog. The processes, methods, systems, tools described herein are not limited in any way by the nature of the information to be secured and processed or the tools for the same.

Exemplary Implementation in a Distributed Network Environment

Figure 10:
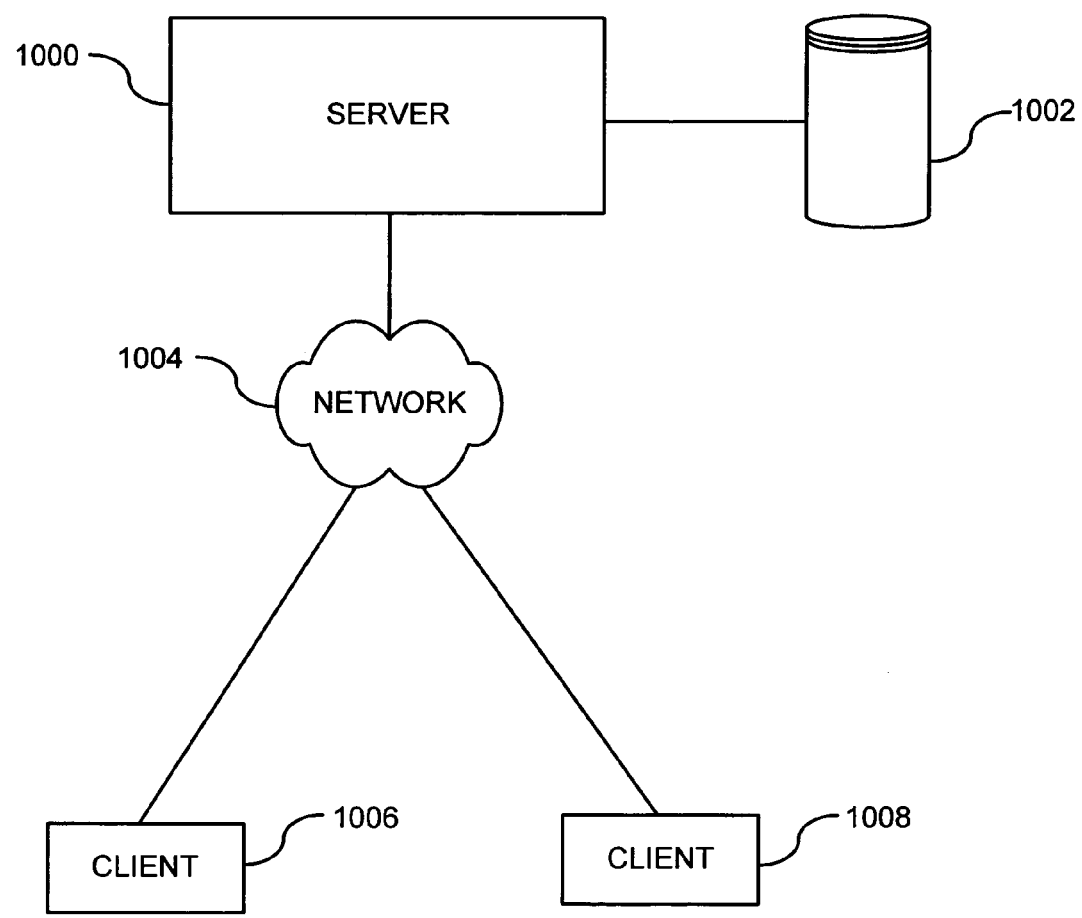
FIG. 10 is a diagram illustrating an exemplary client-server network environment.

Any of the aspects of the technology described above may be performed or designed using a distributed computer network. FIG. 10 shows one such exemplary network. A server computer 1000 can have an associated storage device 1002 (internal or external to the server computer). For example, the server computer 1000 can be configured to process EDA information related to circuit designs using any of the embodiments described above (e.g., as part of an EDA software tool). The server computer 1000 may be coupled to a network, shown generally at 1004, which can comprise, for example, a wide-area network, a local-area network, a client-server network, the Internet, or other such network. One or more client computers, such as those shown at 1006, 1008, may be coupled to the network 1004 using a network protocol.

Figure 11:
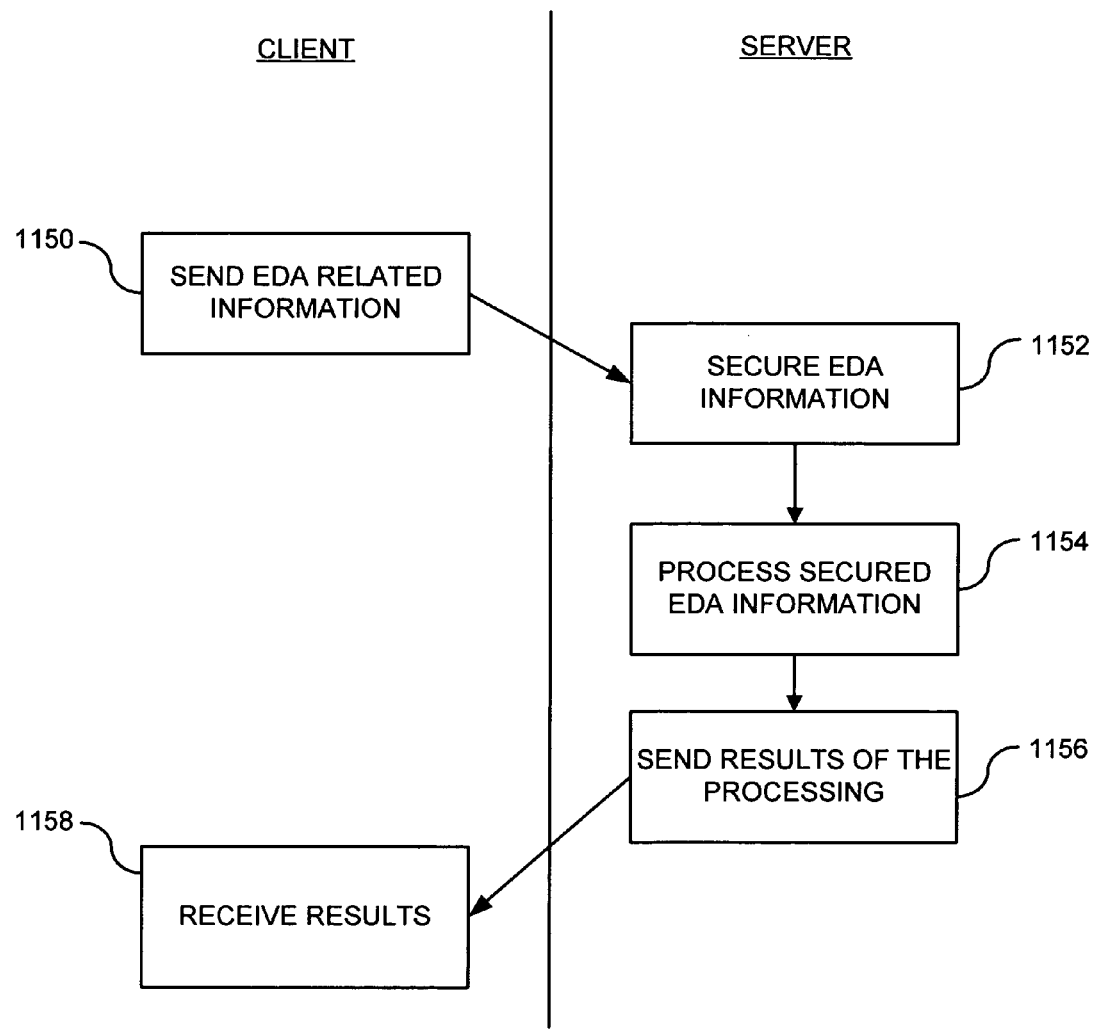
FIG. 11 is a diagram illustrating an exemplary method of securely exchanging electronic design automation information using a client-server network, such as the one illustrated in FIG. 10.

FIG. 11 shows that a client computer (e.g., 1006 and 1008) receives results (e.g., errors related to rule files and alternative IC design layouts that do violate selected rules) related to secure processing of EDA related information (e.g., IC rule files) according to any of the embodiments disclosed herein using a remote server computer, such as the server computer 1000 shown in FIG. 10. In process block 1150, for example, a client computer sends data related to EDA. For instance, a client computer may send a rule file, one or more proposed IC design layouts and other EDA information from a design database. In process block 1152, the data is received and secured by the server computer according to any of the disclosed embodiments. Alternatively, the client computer may secure the EDA information to be processed and send such secured EDA information to the server for processing.

In process block 1154, the EDA related information is processed according to any of the disclosed embodiments. In process block 1156, the server computer sends the results (e.g., errors related to rule files and alternative IC design layouts that so not violate selected rules) to the client computer which receives the database in process block 1158. It should be apparent to those skilled in the art that the example shown in FIG. 11 is not the only way to secure EDA related information, process the secured EDA related information and share the results of such processing without revealing the secured EDA related information. For instance, the client computer that sends the EDA related information (e.g., rule files) may not be the same client that receives the results. Also, the EDA related information may be stored in a computer-readable media that is not on a network and that is sent separately to the server. Or, the server computer may perform only a portion of the design procedures.

Having described and illustrated the principles of our invention with reference to the illustrated embodiments, it will be recognized that the illustrated embodiments can be modified in arrangement and detail without departing from such principles. For example, a file may comprise a master file in which multiple, individually protected files comprising EDA related information are included. Thus, for instance multiple IC manufacturers or other third-party entities in the design flow can contribute, use, and/or share rule files without revealing certain proprietary information.

Elements of the illustrated embodiment shown in software may be implemented in hardware and vice versa. Also, the technologies from any example can be combined with the technologies described in any one or more of the other examples. Thus, for instance, any method, process, system or tool described herein with respect to secure processing of rule files for physical verification may be used in conjunction with other EDA related information for other EDA uses in other EDA related tools. In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. We therefore claim as our invention all subject matter that comes within the scope and spirit of these claims.

We claim:

1. A method for secure exchange of electronic design automation information, the method comprising:
   receiving electronic design automation information comprising secured and unsecured portions wherein the electronic design automation information is annotated to indicate the secured portions thereof;
   identifying the secured portions of the electronic design information based on the annotations;
   unlocking the secured portions of the electronic design information;
   processing at least some of the secured portions of the electronic design information to generate results; and
   revealing at least some of the results without revealing at least some of the secured portions of the electronic design information.

2. The method of claim 1, further comprising securing at least some portion of the results.

3. The method of claim 2, further comprising transferring at least some portion of the secured results to another tool.

4. The method of claim 1, further comprising transferring at least some portion of the results to another tool.

5. The method of claim 1, further comprising transferring at least some portion of the electronic design information to another tool for further processing.

6. The method of claim 1, wherein the electronic design automation tool is a physical verification tool and the electronic design automation information comprises rules related to manufacture of integrated circuits.

7. A method for secure exchange of rules related to manufacture of integrated circuits, the method comprising:
- annotating the rules related to manufacture of integrated circuits to select portions thereof to be secured;
- securing the portions of the rules selected to be secured to generate secured rules related to manufacture of integrated circuits;
- annotating the rules related to manufacture of integrated circuits to indicate portions comprising the secured rules related to manufacture of integrated circuits;
- unlocking the secured rules related to manufacture of integrated circuits;
- receiving data related to one or more integrated circuit layouts;
- verifying whether the one or more integrated circuit layouts violate any of the rules related to manufacture of integrated circuits; and
- providing error reports indicating results of the verification without revealing at least some of the secured rules.

8. The method of claim 7, wherein annotating the rules related to manufacture of integrated circuits to indicate portions thereof to be secured comprises adding at least one indicator to indicate a beginning for the portion to be secured.

9. The method of claim 7, wherein annotating the rules related to manufacture of integrated circuits to indicate portions thereof to be secured comprises adding at least one indicator to indicate an end of the portion to be secured.

10. The method of claim 7, wherein securing the portions of the rules selected to be secured comprises using a key to encrypt the selected portions.

11. The method of claim 7, wherein unlocking the secured rules related to manufacture of the integrated circuits comprises using a key to decrypt the secured rules.

12. The method of claim 7, wherein the error report refers to rules that were violated in general terms without revealing substance of those rules.

13. A method of processing secured electronic design automation information by an electronic design automation tool, the method comprising:
- receiving a file comprising secured and unsecured portions of the electronic design automation information for processing by the electronic design automation tool;
- using a common embedded key hidden in decryption code of the electronic design automation tool to access the secured portions of the electronic design automation information; and
- processing at least some of the accessed secured portions of the electronic design automation information without revealing at least some of the accessed secured portions of the electronic design automation information.

* * * * *